UNITED STATES PATENT OFFICE.

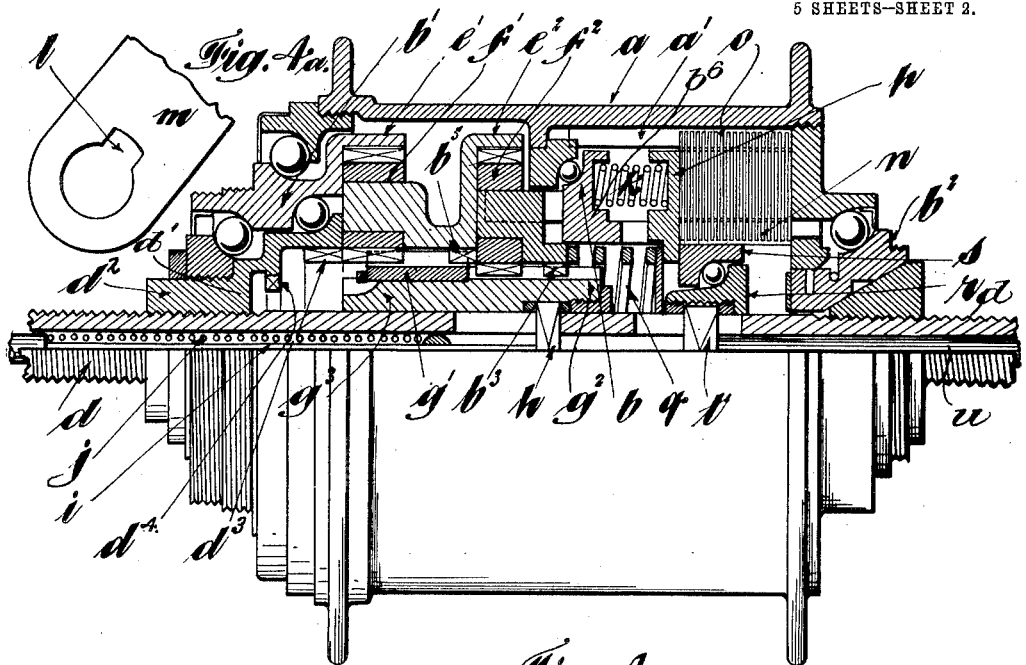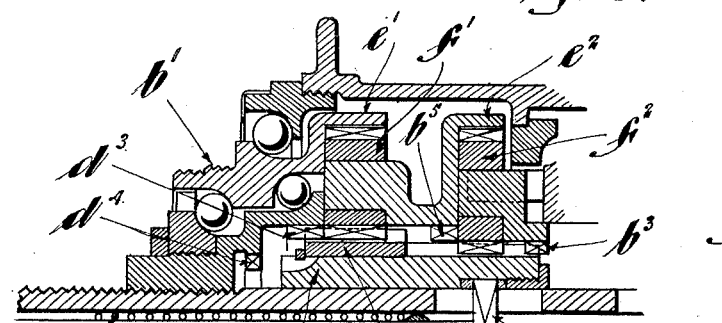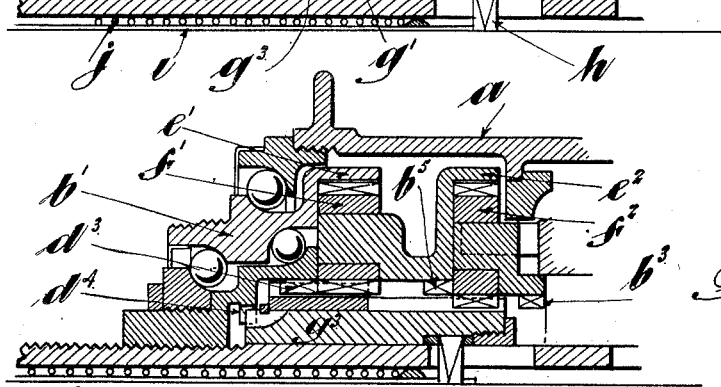

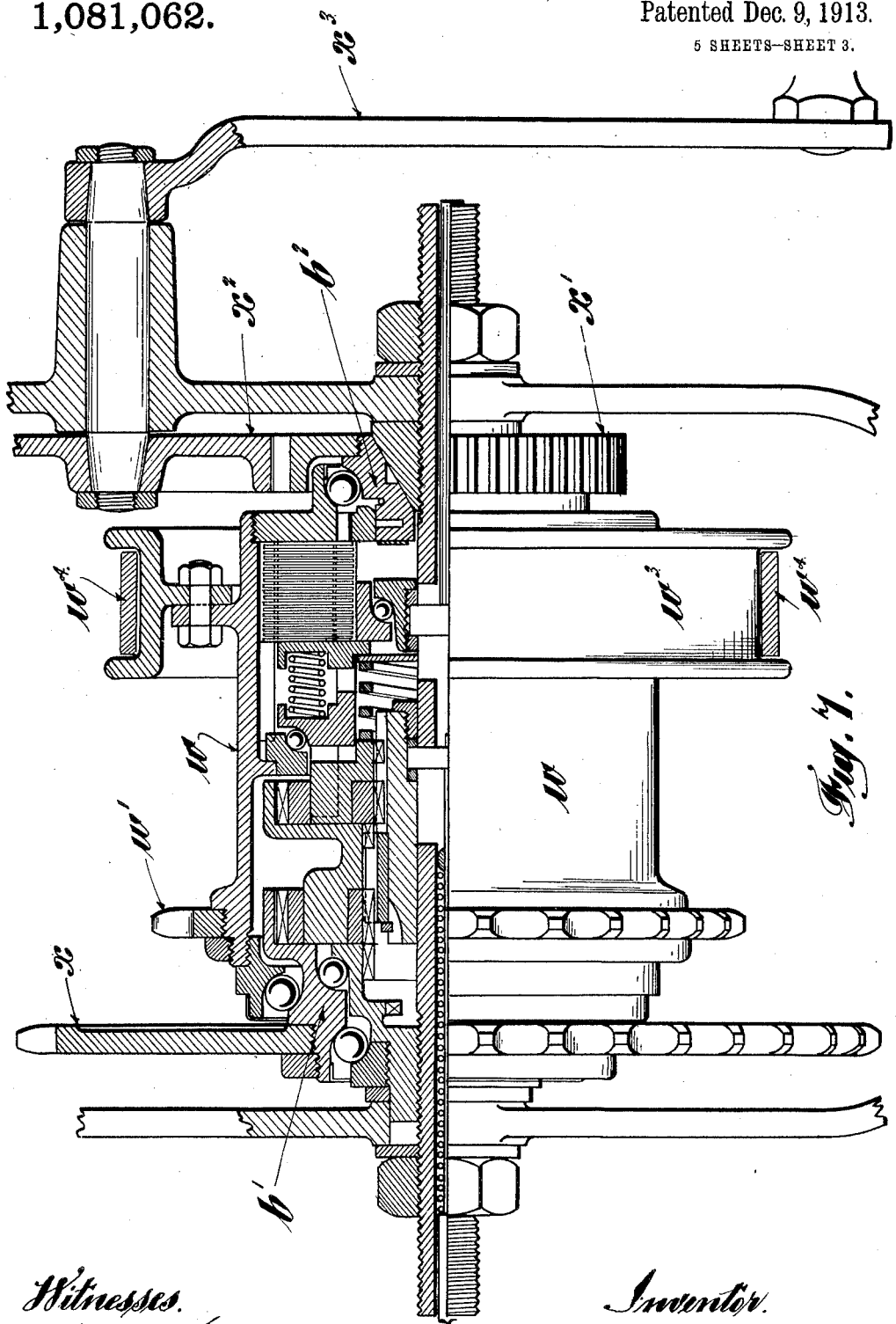

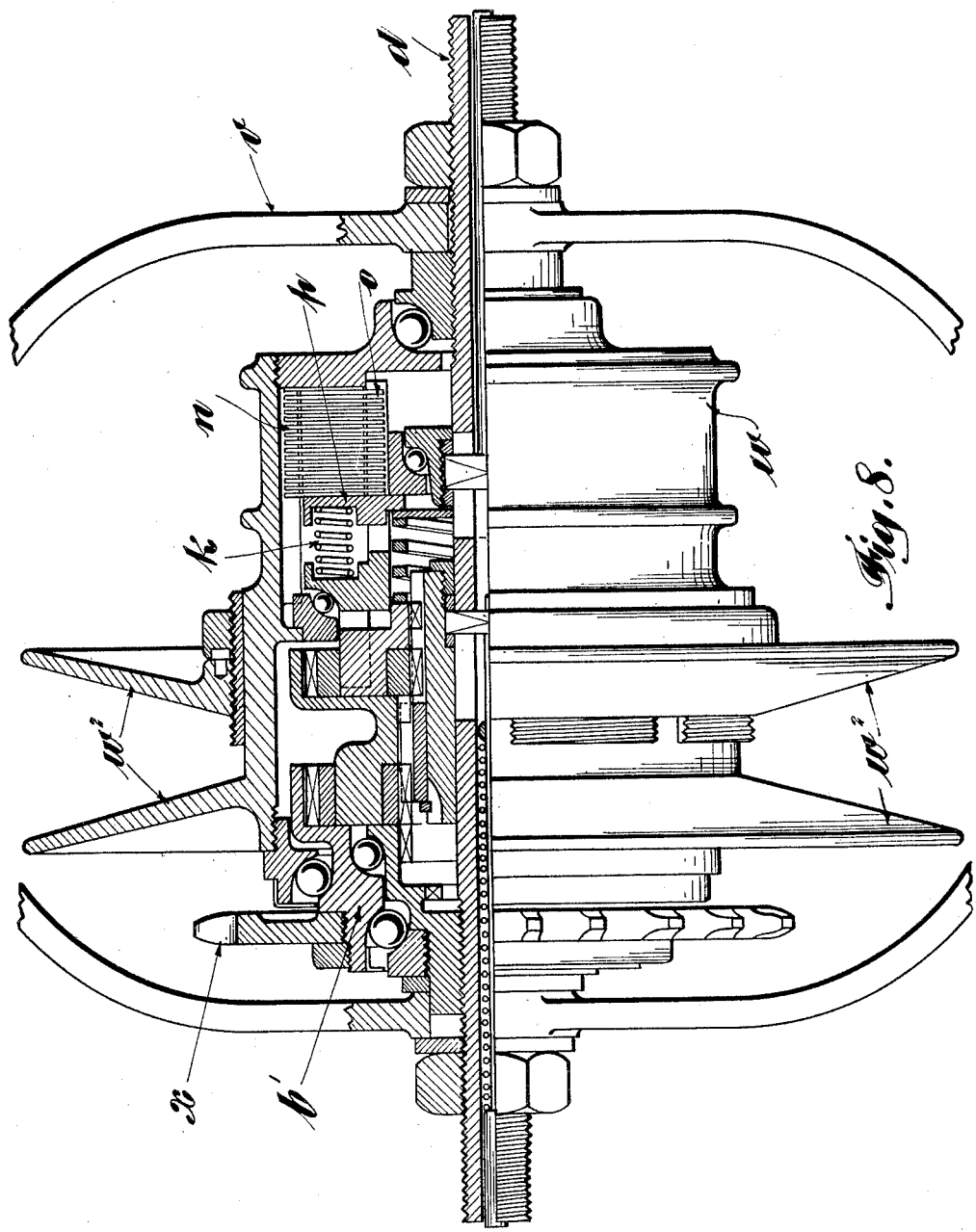

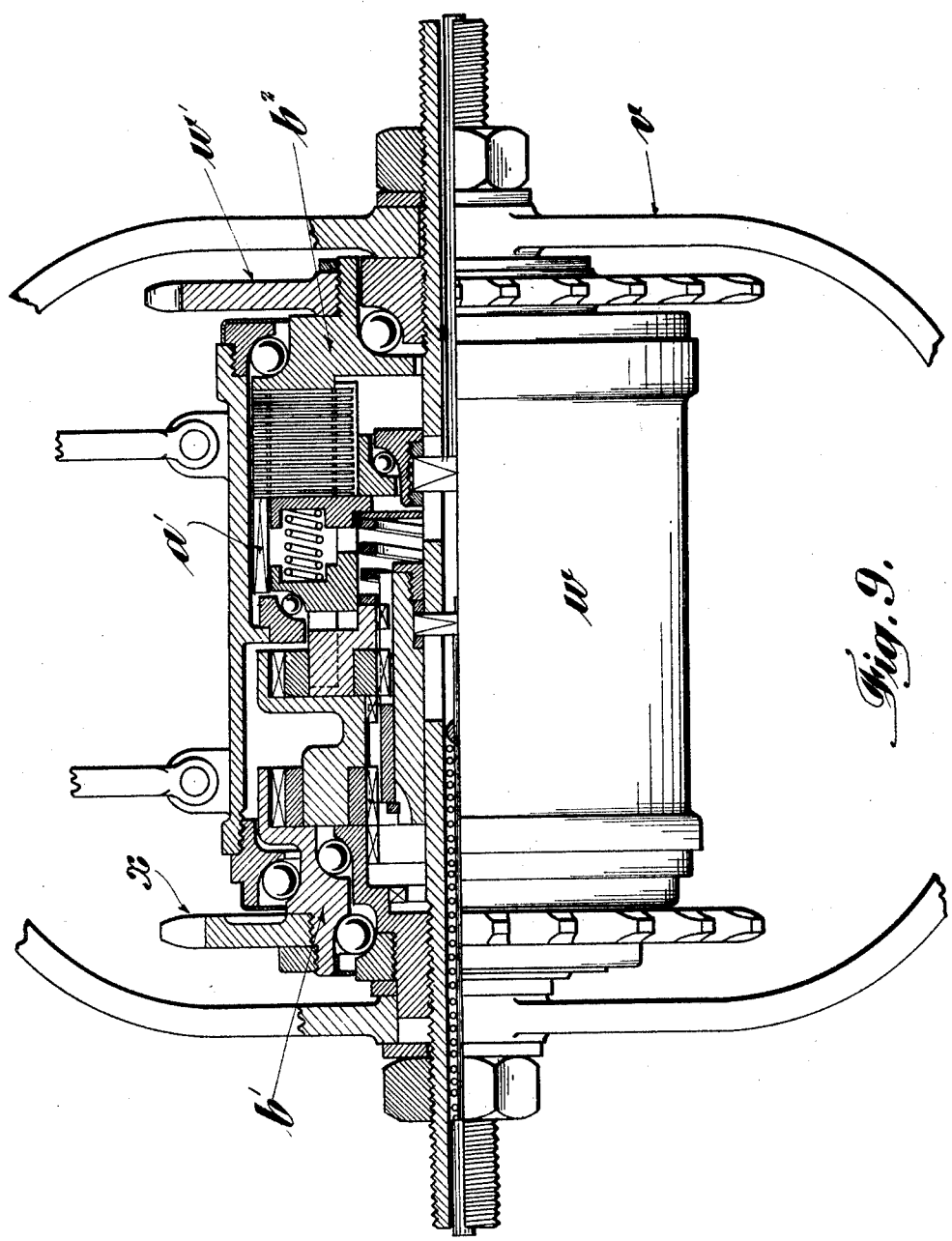

WILLIAM HENRY RAVEN, OF LENTON, NOTTINGHAM, ENGLAND.

VARIABLE-SPEED GEARING.

1,081,062.   Specification of Letters Patent.   Patented Dec. 9, 1913.

Application filed September 24, 1912. Serial No. 722,071.

*To all whom it may concern:*

Be it known that I, WILLIAM HENRY RAVEN, a subject of the King of Great Britain and Ireland, and resident of Lenton, Nottingham, England, have invented an Improved Variable-Speed Gearing, of which the following is a specification.

This invention relates to variable epicyclic speed gearing for motor bicycles and motor propelled vehicles and refers in particular to epicyclic speed gears combined with a friction clutch, the clutch being interposed between the gearing and the hub or other member to be driven by the gearing, or between the engine and hub.

The object of the invention is to provide an epicyclic variable speed gearing and driving clutch, which allows of a more compact arrangement and a stronger construction of the parts than usual in variable speed gearings of the known kind.

The invention is designed for use in the hub of the rear wheel of a motor bicycle, or at a point intermediate of the engine and rear wheel, this latter application being what may be termed a counter-shaft drive.

Figure 1:
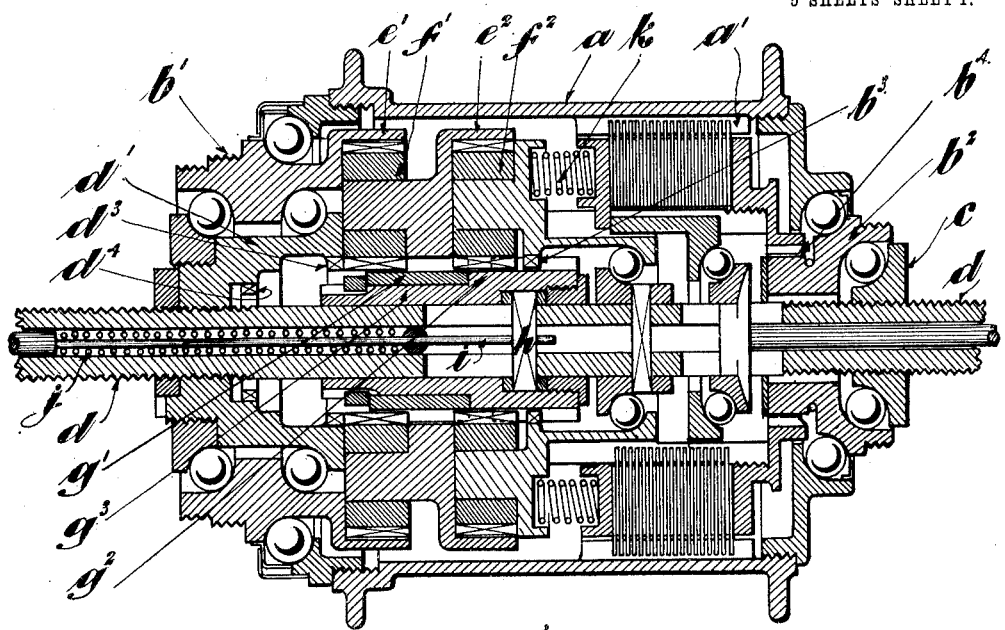
Figure 2:
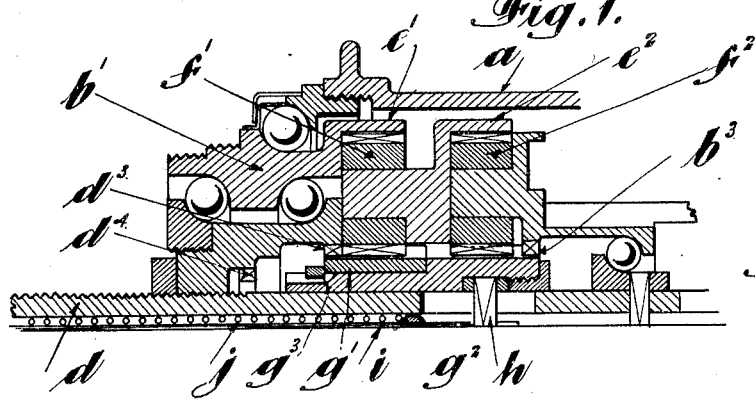
Figure 3:
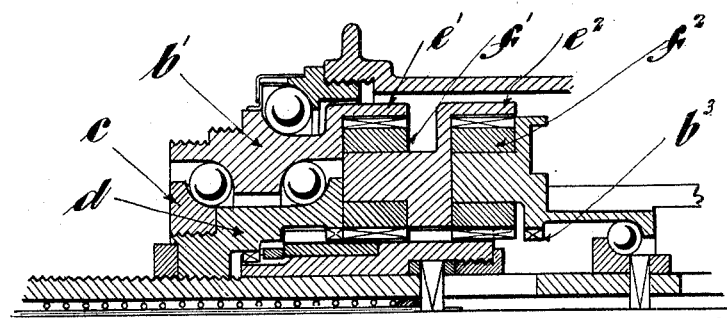

Referring to the drawings, Figure 1 illustrates a longitudinal section of a motor cycle hub fitted with the improved variable speed gearing and driving clutch, the gearing being adapted to give three speeds and the parts of the gearing being shown in the highest or "normal" speed position. Fig. 2 illustrates a like view to Fig. 1 of the gearing only but with the parts in the intermediate speed position. Fig. 3 illustrates a like view to Fig. 2, but with the parts in the lowest speed position. Fig. 4 illustrates a part sectional and part exterior view of a motor cycle hub fitted with a modification of the gearing. Figs. 4$^a$ and 4$^b$ illustrate details. Figs. 5 and 6 illustrate longitudinal sections of gearing shown in Fig. 4 but with the parts shown in the "intermediate" and "lowest" speed positions respectively. Fig. 7 illustrates the gearing adapted as a counter-shaft drive for motor bicycles, the view being a part longitudinal section and part exterior view. Fig. 8 illustrates a part longitudinal section and part exterior view of a modification of Fig. 7. Fig. 9 illustrates a like view to Figs. 7 and 8 but showing a further modification.

Referring to Figs. 1, 2 and 3, the wheel hub $a$ is mounted on say ball bearings on the exterior of two driving members $b'$, $b^2$ and the latter are mounted on ball bearing cones $c$ which are adjustable on a fixed axle $d$. The driving member $b'$, which may be connected to the motor by means of a belt or other suitable form of gearing, is connected to the second driving member $b^2$ by means of the variable gearing, which will be hereinafter described. The driving member $b^2$, which may be connected to the pedal crank axle by means of say sprocket wheels and a chain, is connected to the hub $a$ by means of a clutch preferably of the frictional type. The hub $a$ can thus be driven by the motor through the intermediary of the first driving member $b'$, the variable gearing, the second driving member $b^2$ and the clutch. It can also be driven from the pedal crank axle through the intermediary of the second driving member $b^2$ and the clutch. The motor can further be turned and thus started by the pedal crank axle through the intermediary of the second driving member $b^2$, the variable gearing, and the first driving member $b'$, while the hub $a$ is stationary, being disconnected by means of the clutch. The driving member $b'$ is provided with an annular toothed wheel $e'$ and this annular toothed wheel is connected by toothed epicyclic reducing gearing $f'$ to a second corresponding annular toothed wheel $e^2$ mounted loosely on the fixed axle $d$. This second annular toothed wheel $e^2$ is geared to the second driving member $b^2$ by means of a second epicyclic reducing gear train $f^2$. The epicyclic gearing is the same in each case, and comprises a series of epicyclic wheels mounted on axles on the driven member, said wheels engaging in each case with the teeth of the annular wheel on the driving member and the teeth of a central pinion situated on the fixed axle. There are two central or sun pinions $g'$, $g^2$ one for each gear train, and they are not formed integrally with or secured to the fixed axle $d$ as is usual, but are arranged so that they can be moved along the same into different positions, and thus allow either one or both to be locked to the axle $d$, and one, the pinion $g^2$ to be locked to or disengaged from the second driving member $b^2$ in order to effect the gear changes. The central pinion $g^2$ is mounted loosely on the fixed axle $d$ and on the side opposite to the second driving member $b^2$ is provided with a sleeve or tubular extension $g^3$, on which the first central pinion $g'$ is rotatably mounted. The extreme end of the sleeve or extension $g^3$ is formed so as to constitute one member of say a dog clutch. The driving member $b^2$ is provided with clutch teeth $b^3$ to admit the end of the central pinion $g^2$ and on the reverse side to said member, the fixed axle $d$, or a relatively fixed part $d'$ is provided with two sets of clutch teeth $d^3$, $d^4$, the first set to receive the end of the central pinion $g'$ and lock it to the axle $d$, and the other to receive the end of the sleeve $g^3$ on the second central pinion $g^2$ and lock this pinion to the axle. The two central pinions $g'$, $g^2$ are moved together along the axle $d$ by means of a suitable connection, such as the cross-pin $h$ and rod $i$ and a spring $j$, this latter moving the pinions back after they have been moved toward the left hand end of the hub. The highest speed is obtained by moving the central pinion $g^2$ into engagement with the clutch teeth $b^3$ in the second driving member $b^2$, see Fig. 1. The said pinion and the whole of the gear train $f^2$ is then locked to the driving member $b^2$ and at the same time the central pinion $g'$ is moved partly into engagement with the epicyclic wheels of the second train $f^2$ and as a result of this the central pinion $g'$ and the whole of the gear train $f'$ are locked to the gear train $f^2$. The whole of the gear mechanism is in these circumstances locked and therefore the two driving members $b'$, $b^2$ are locked together, the central pinions $g'$, $g^2$ are detached or free from the fixed axle $d$, and the whole rotate together as one piece, giving a direct drive from the first to the second driving member with the gearing idle. By moving the two central pinions $g'$, $g^2$ a short distance in the reverse direction, the end of the pinion $g'$ is moved into engagement with the clutch teeth $d^3$ and is thus locked to the fixed axle $d$ while the pinion $g^2$ remains locked to the driving member $b^2$, see Fig. 2. The gear train $f^2$ is in this case locked and the driving member $b^2$ is driven through the intermediary of the first train of gearing $f'$. Its speed and that of the hub $a$ is reduced by the said gear train $f'$ thus giving the intermediate speed. By a further movement of the central pinions $g'$, $g^2$ in the same direction, the central pinion $g^2$ is released from the driving member $b^2$ and is locked to the fixed axle $d$ by reason of the clutch member at the end of its sleeve $g^3$ engaging with the clutch teeth $d^4$. Both central pinions are now locked to the fixed axle and the driving member $b^2$ and the hub $a$ are driven through the intermediary of both reducing gearings thus giving the lowest speed, see Fig. 3. The frictional clutch for connecting the driving member $b^2$ to the hub $a$ may be of the well known plate type and is controlled by springs $k$ and a connection carried through the interior of the fixed axle from the opposite end to that from which the variable gearing is controlled. The driving member $b^2$ may, as shown, comprise a free wheel clutch connection at $b^4$ (see Fig. 4$^b$) in order to allow of free-wheeling.

Referring now to Figs. 4 to 6, the central pinion $g'$ is mounted as before described on a sleeve or extension $g^3$ of the pinion $g^2$ but instead of both pinions being the same size, the pinion $g'$ is larger in diameter than the pinion $g^2$. This allows of a clutch $b^5$ being provided for the central pinion $g'$ in connection with the driving member $b^2$ of the second train $f^2$, so that when the pinion $g^2$ is moved into engagement with the clutch teeth $b^3$ on and locked to the driving member $b^2$, the central pinion $g'$ is moved into engagement with the clutch teeth $b^5$ on and locked to the driving member $e^2$ of the second train $f^2$, instead of being moved into gear with the epicyclic wheels of that train. This gives exactly the same result as moving the pinion $g'$ into gear with the second train $f^2$ as previously mentioned, but it permits of a much stronger construction, it is moved into engagement with greater ease, and the strain is removed from the wheels of the second gear train $f^2$ when the whole of the gearing is locked and is therefore inoperative. The two central pinions $g'$, $g^2$ are moved together longitudinally along the fixed axle $d$. The sleeve $g^3$ on the pinion $g^2$ is provided with a clutch member at its extreme end and the axle $d$ is provided with a relatively fixed double clutch member $d'$, one part of which is adapted to engage with the pinion $g^2$ and lock it to the axle, while the other part is adapted to engage with the clutch member on the end of the sleeve or extension $g^3$ of the pinion $g^2$ and lock the latter to the axle. The said clutch members are so arranged that the pinion $g'$ can be engaged and locked to the axle $d$ while the pinion $g^2$ is free and the pinion $g^2$ be subsequently engaged and locked to the axle by a further movement without unlocking the pinion $g'$. Under the action of the spring $j$ the pinions $g'$, $g^2$ are normally held in the position shown in Fig. 6. In such position the rotation of the driving member $b'$ serves through the two trains of gearings $f'$, $f^2$, driving member $b^2$ and clutch to rotate the hub $a$ at the lowest speed. With the pinion $g^2$ unclutched from the clutch teeth $d^4$ and such pinion clutched to the teeth $b^3$, the hub is driven at the intermediate speed, see Fig. 5. With both pinions unclutched from the member $d'$, the pinion $g'$ clutched to the member $e^2$ and the pinion $g^2$ clutched to the member $b^2$, the hub is rotated at the normal or highest speed, the planetary gearings then all rotating as one, see Fig. 4. To help in resisting the torque on the member $d'$ this latter may have a projection $d^2$, see Fig. 4 adapted to fit a keyway $l$ in the end of the frame fork $m$, see Fig. 4ª. The frictional driving clutch, which is employed for connecting the member $b^2$ to the hub $a$ is for convenience preferably of the frictional plate type. The member $b^2$ is provided with longitudinal slots with which engage small projections on the alternate friction plates or disks $n$. The friction plates $o$ engage the internal teeth $a'$ of the hub. The plates are forced together for the purpose of clutching the member $b^2$ to the hub by means of a ring $p$ and a number of springs $k$ acting between the ring $p$ and a flange $b^6$ on the member $b^2$ and a large central spring $q$. The member $b^2$ is unclutched from the hub by the sliding boss $v$, ring $s$, cross bar $t$ and rod $u$, which on being moved toward the variable gearing, reduce the pressure of the springs $k$ on the ring $p$ and thus allow the disks $n$ to rotate without rotating the hub. The driving member $b^2$ transmits its movements to the member $b'$ through a free-wheel connection and thus with the hub unclutched allows of the engine being started with the wheel of the bicycle on the ground.

Referring to Figs. 7 and 8, which show the invention as adapted for a counter-shaft drive, the fixed axle $d$ in each case is secured to a frame $v$ forming part of the motor bicycle frame, and arranged between the engine and rear wheel. The gearing is arranged within the rotary shell or casing $w$ upon the exterior of which, in Fig. 7, is fixed a sprocket wheel $w'$, and, in Fig. 8, a divided cone pulley $w^2$. By means of the wheel $w'$ and a chain, or the pulley $w^2$ and a belt, the motion of the shell will be transmitted to the rear wheel of the bicycle. Upon the primary member $b'$ of the gearing is a sprocket wheel $x$ by which, and a chain, the motion of the engine is transmitted to the gearing. Upon the member $b^2$ (Fig. 7) is a spur pinion $x'$ and meshing with such pinion is a further pinion $x^2$ by rotating which, by means of a handle $x^3$ with the shell $w$ unclutched from the gearing the gearing may be rotated to start the engine.

In Fig. 9 the shell or casing $w$ is held stationary, and the sprocket wheel $x$ applied to the member $b'$ and the sprocket wheel $w'$ to the member $b^2$. The teeth $a'$ of the clutch are made integral with the member $b^2$.

While showing the clutch $n$, $o$ between the gearing and shell $w$ it will be understood that the clutch may be arranged between the engine and gearing.

Again referring to Figs. 7 and 8, a brake surface $w^3$ may be applied to the exterior of the shell, which in conjunction with a brake strap $w^4$, one end of which is secured to the bicycle frame, may serve to arrest the movements of the shell and vehicle.

What I claim is:—

1. In variable speed gearing, the combination with a relatively fixed axle and relatively fixed axle supports, one of said axle supports having two rings of clutch teeth, of a driving member journaled on one of said axle supports, an internally toothed wheel connected to said driving member, two sets of planetary pinions and axles for said pinions, a further internally toothed wheel between the two sets of planetary pinions and having clutch teeth, a further driving member also having clutch teeth, the axles of one set of planetary pinions being carried by the second-named internally toothed wheel, and the axles of the other set of planetary pinions being carried by the second-named driving member, two sun pinions encircling the first named axle and one having a lateral extension upon which the other pinion is rotatably mounted, means for moving the two sun pinions simultaneously in the same direction along the said axle, said sun pinions being movable endwise to respectively and successively move into and out of engagement with said rings of clutch teeth, and a final driven member with which the second-named driving member is connected, substantially as herein set forth.

2. In variable speed gearing, the combination with a tubular casing, a relatively fixed axle for such casing and relatively fixed axle supports, one of said axle supports having two rings of clutch teeth, of a driving member rotatably mounted between one of the axle supports and the casing, an internally toothed wheel connected to said driving member, two sets of planetary pinions within the casing and axles for said pinions, a further internally toothed wheel between the two sets of planetary pinions and having clutch teeth, a further driving member also having clutch teeth, the axles of one set of planetary pinions being carried by the second-named internally toothed wheel and the axles of the other set of planetary pinions being carried by the second-named driving member, two sun pinions, respectively designed to engage the said clutch teeth, encircling the axle of the casing and one having a lateral extension upon which the other pinion is rotatably mounted, means for moving the two sun pinions simultaneously in the same direction along the said axle, said sun pinions being movable endwise to respectively and successively move into and out of engagement with said rings of clutch teeth, friction clutch devices between the second-named driving member and the casing, means for operating the friction clutch devices to connect the second-named driving member to the